(12) United States Patent
Miller et al.

(10) Patent No.: US 7,836,347 B2
(45) Date of Patent: Nov. 16, 2010

(54) SERVICE AND DIAGNOSTIC LOGIC SCAN APPARATUS AND METHOD

(75) Inventors: Daniel H. Miller, Charlottesville, VA (US); Ferrell Mercer, Madison, VA (US); Judy Popelas, Charlottesville, VA (US)

(73) Assignee: GE Intelligent Platforms Inc., Charlottesville, VA (US)

(*) Notice: Subject to any disclaimer, the term of this patent is extended or adjusted under 35 U.S.C. 154(b) by 347 days.

(21) Appl. No.: 11/873,852

(22) Filed: Oct. 17, 2007

(65) Prior Publication Data
US 2009/0106590 A1    Apr. 23, 2009

(51) Int. Cl.
*G06F 11/00* (2006.01)
(52) U.S. Cl. .......................................... 714/38; 714/31
(58) Field of Classification Search .................. 714/38, 714/39, 37, 31, 47; 717/124, 126, 127
See application file for complete search history.

(56) References Cited

U.S. PATENT DOCUMENTS

| | | | |
|---|---|---|---|
| 5,600,807 A | | 2/1997 | Itoh |
| 5,754,451 A | * | 5/1998 | Williams .................... 702/185 |
| 5,812,759 A | * | 9/1998 | Brooks ........................ 714/57 |
| 6,912,678 B1 | * | 6/2005 | Floro et al. .................. 714/724 |
| 7,110,837 B2 | * | 9/2006 | Oka et al. .................... 700/87 |
| 2004/0230322 A1 | * | 11/2004 | Oka et al. .................... 700/18 |
| 2009/0240991 A1 | * | 9/2009 | Branndmahl-Estor et al. . 714/47 |

FOREIGN PATENT DOCUMENTS

EP    1457850 A    9/2004

* cited by examiner

*Primary Examiner*—Dieu-Minh Le
(74) *Attorney, Agent, or Firm*—Global Patent Operation; Mark A. Conklin

(57) ABSTRACT

A diagnostic and service logic program for a programmable logic controller (PLC) is provided in parallel with the main machine logic program. The diagnostic and service logic program has the same functionality as the main machine logic program, but can be modified and operated independently of the main machine logic program for testing and debugging a faulty main machine logic program. The PLC can be switched between programs for testing and debugging.

9 Claims, 2 Drawing Sheets

SERVICE AND DIAGNOSTIC LOGIC SCAN APPARATUS AND METHOD

BACKGROUND

Field of the Invention

The field of the invention relates to programmable controllers and systems.

Programmable logic controllers (PLCs) and programmable automation controllers (PACs) both contain complex logic trees for controlling operation of diverse systems of devices to automate processes. The processes are controlled by the programmable logic controller scanning a logic program contained therein. As the scan through the logic program progresses, different operations occur depending on the state of connected devices and status indicators as reported via feedback from the connected devices and status indicators.

When systems having programmable logic controllers or programmable automation controllers fail or do not work properly, determining the root cause of the failure or error can be very difficult. Due to user requirements, service engineers are not usually permitted to modify the installed logic program as a method for determining the root cause of the abnormal installed logic program execution. Often, the abnormal logic operation can be found in the installed logic program. Diagnosing and fixing, or debugging, the problem is made much more difficult when the service engineer is not permitted to make changes to the installed logic program.

Presently, the only option for service engineers trying to debug installed logic programs is to access the variables within the installed program and change the variables to different forced values and observe the installed program logic operation using the forced values. Service engineers cannot modify or alter the actual logic or programming of the installed logic program, however, so that they may only test the existing logic program.

Accordingly, a need exists for an improved system and method for programmable logic controllers and programmable automation controllers to make testing and fixing abnormal logic operations easier and more convenient than presently available.

BRIEF DESCRIPTION OF THE INVENTION

A programmable logic controller (PLC) or programmable automation controller (PAC) according to an embodiment of the invention includes a diagnostic and service logic program in addition to a main logic program. The programmable logic controller is switchable between operating the main logic program for normal operations and operating the diagnostic and service logic program in a debugging or test mode. The diagnostic and service logic program is connectable to the same devices connected to the programmable logic controller main logic program, so that it is fully functional for testing and debugging the programmable logic controller system operation. Changes made to the diagnostic and service logic program do not affect the main logic program during debugging and testing.

In another aspect of the invention, the main logic program and diagnostic and service logic program can run simultaneously, with an interface switch used to control which logic program instructions are used by a particular device.

According to a further aspect of the invention, changes made in the diagnostic and service logic program can be copied to the main logic programming.

In yet another embodiment of the invention, a method for operating a programmable logic controller system includes determining if testing or debugging is necessary, switching from a main logic program to a diagnostic and service program, debugging and testing the programmable logic controller system, switching back to the main logic program.

A further embodiment of the invention includes copying changes from the diagnostic and service program after debugging and testing before switching back to the main logic program.

The various features of novelty which characterize the invention are pointed out with particularity in the claims annexed to and forming a part of this disclosure. For a better understanding of the invention, its operating advantages and benefits obtained by its uses, reference is made to the accompanying drawings and descriptive matter. The accompanying drawings are intended to show examples of the many forms of the invention. The drawings are not intended as showing the limits of all of the ways the invention can be made and used. Changes to and substitutions of the various components of the invention can of course be made. The invention resides as well in sub-combinations and sub-systems of the elements described, and in methods of using them.

DETAILED DESCRIPTION OF THE INVENTION

Figure 1:
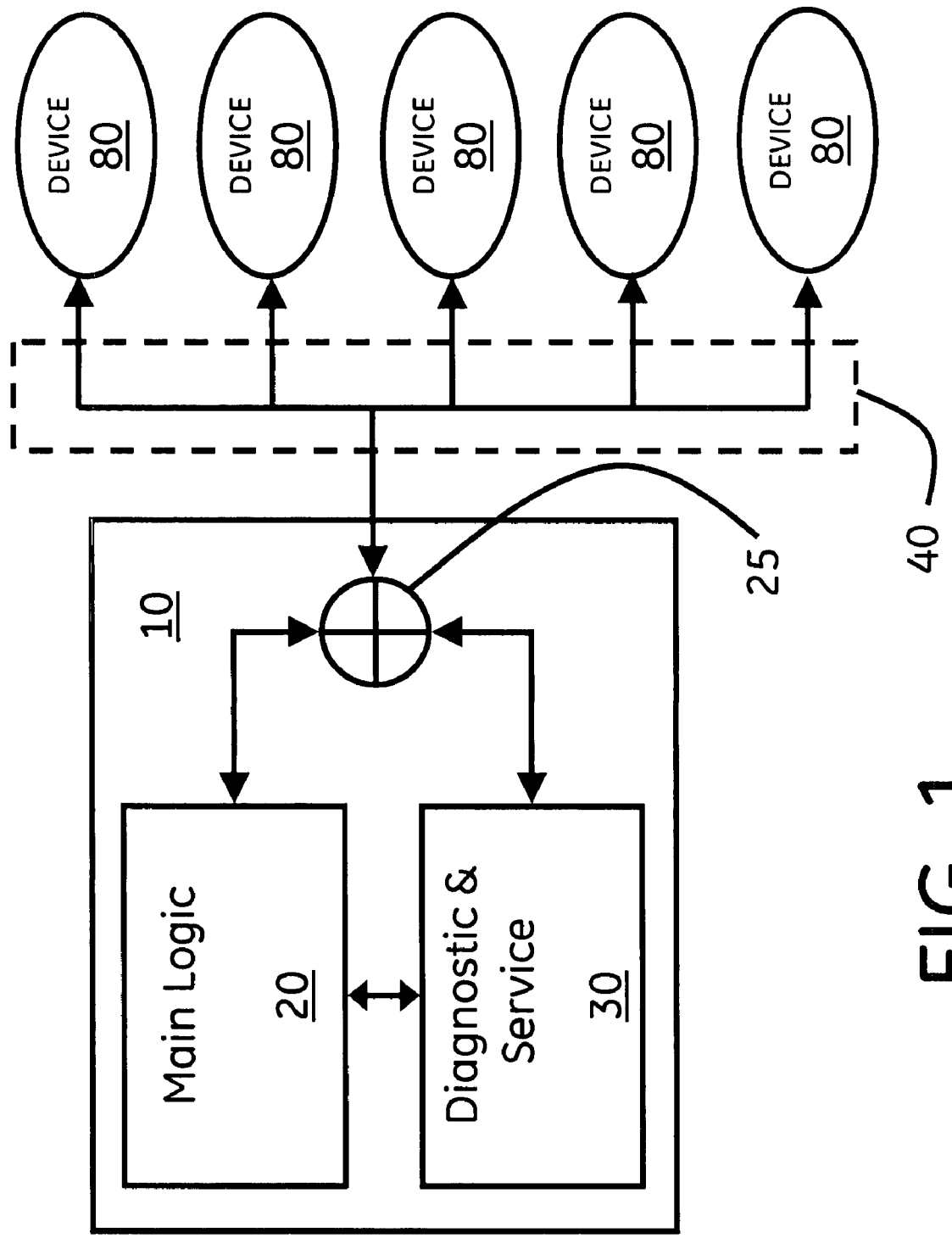
FIG. 1 is a schematic diagram illustrating a programmable logic controller system in accordance with one embodiment of the invention.

Referring now to the drawings in which like reference numerals are used to indicate the same or related elements, FIG. 1 schematically illustrates a controller 10, such as a PLC or PAC, in accordance with an embodiment of the invention having an installed, or main, logic program 20 containing logic for operating one or more devices 80 connected with the programmable logic controller 10 through a communications bus 40. The devices 80 can be motors or other mechanical motion devices, status indicators, such as thermometers, level detectors, or other sensors. Controller 10 further includes diagnostic and service logic program 30 connected to the communications bus 40 and devices 80 via a switch 25.

Switch 25 is a hardware or software switch for changing between the main logic program 20 and diagnostic and service logic program 30. The diagnostic and service (D&S) logic program 30 is initially a copy of the main logic program 20. Connection to the communications bus 40 and devices 80 via switch 25 permits the diagnostic and service logic program 30 to be used as if it were the main logic program 20 without the risk of actually modifying the main logic program 20 during debugging.

When an abnormal operation is detected in the main program logic 20, the switch 25 is used to activate the diagnostic and service logic program 30 for debugging the program logic. A service engineer or other user may make changes to the program logic and operation, in addition to simply forcing variable values to test different theories of failure in an effort to determine the root cause of the abnormal logic program operation. Changes can be freely made to the diagnostic and service logic program 30 during debugging, with no effect on the main logic program 20, so that operator requirements are satisfied as well.

In a further aspect of the invention illustrated in FIG. 1, the switch 25 may effectively be a software switch in the interface with the devices 80. In this aspect of the invention, the main logic program 20 and diagnostic and service logic program 30 are able to be active at the same time, and the controller 10 is operating both logic programs 20, 30 simultaneously. The diagnostic and service logic program 30 in this case is not necessarily a copy of the main logic program 20.

The benefit of this configuration of the diagnostic and service logic program 30 is that a debugging section of logic can be implemented in the diagnostic and service logic program 30 that is not possible to be implemented in the main logic program 20. In one example of the advantages of this embodiment of the invention, a shorter sample period can be used in the diagnostic and service logic program 30 than in the main logic program 20. The shorter sample period permits more information is to be gathered about one or more device 80 states, for example. In a still further example, a data logging section can be implemented in the diagnostic and service logic program 30 that cannot otherwise be added to the main logic program 20. Thus, the diagnostic and service logic program 30 can be used to gather data about the devices 80 that the system 10 otherwise could not be obtained using main logic program 10 alone.

And, in yet another aspect of the invention wherein the diagnostic and service logic program 30 operates at the same time as the main logic program, the diagnostic and service logic program 30 contains a section of testing code for evaluating a particular system response to a particular instruction or set of instructions that is not present in the main logic program 20 and cannot be added.

Regardless of the configuration of the controller 30, if the debugging reveals a solution in the form of changed program logic, the solution may be copied from the diagnostic and service logic program 30 to the main logic program 20 to implement the changes. The copying may be accomplished using computer commands or functions when the programs 20, 30 are stored in the same or separate memories or other IC's, such as FPGA's, EEPROMs, or other programmable devices within the programmable logic controller 10. Alternatively, the main logic program 20 can be manually updated with the changes made in the diagnostic and service logic program.

Figure 2:
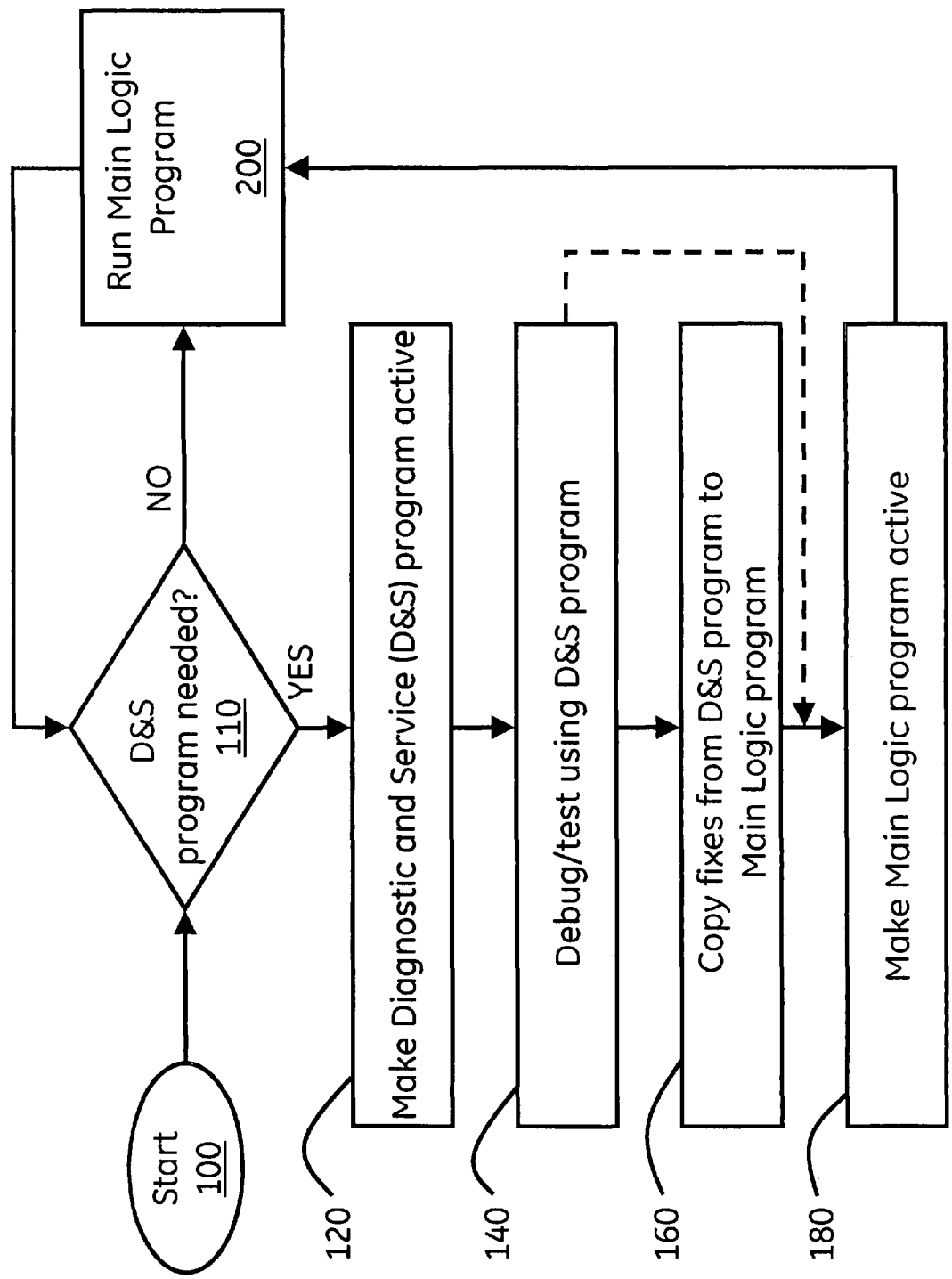
FIG. 2 is a flow chart showing an implementation of one embodiment of the invention.

A method in accordance with one embodiment of the invention is illustrated in FIG. 2. The process starts 100, at which point a determination 110 whether the diagnostic and service logic program 30 is needed is made. If the diagnostic and service logic program 30 is not required, then the main logic program is run 200, and the automated system runs normally until it is determined 110 that the diagnostic and service logic program is required.

Once it is determined there is a need, the diagnostic and service program is made active 120 using switch 25, for example, so that any connected devices 80 will subsequently respond to output from the diagnostic and service program. A user or service engineer can then have access to the programmable logic controller and modify the diagnostic and service program as much as necessary to test, debug 140 and determine a fix for any problems identified in the programmable logic controller program logic or with the system itself.

After the fixes are determined through debugging 140, in practice, a service engineer can use the diagnostic and service logic program to demonstrate the fixes. If the fixes are approved, then either they can be copied 160 into the main logic program to replace that logic with the fixed version, or the main logic program can be manually revised before making the main logic program active 180 again and subsequently running, or scanning 200 the main logic program to control devices 80.

In a variation of this embodiment, when the diagnostic and service logic program is simply run to test different aspects of the control logic, but actual changes to the logic program are not necessary, then the user may progress directly to switching back to making the main logic program active 180 and continuing to scanning 200 the main program logic 20.

In a still further alternative embodiment of the invention, an undo function could be incorporated into the main logic program 20, in which the main logic program 20 in its current state is copied and saved in a memory, so that any changes can be undone. That is, an undesirable change can simply be canceled by writing the immediately prior version of the main logic program from memory back to the working version being modified. In a variation of this embodiment, the main logic program 20 can include version control, whereby different versions of the main logic program 20 are retained, so that it is possible to revert, or roll back, to the earlier version once non-permanent changes have been tested and can be discarded.

While the present invention has been described with references to preferred embodiments, various changes or substitutions may be made on these embodiments by those ordinarily skilled in the art pertinent to the present invention without departing from the technical scope of the present invention.

The construction and arrangement of the diagnostic and service program system and method, as described herein and shown in the appended figures, is illustrative only. Although only a few embodiments of the invention have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in the appended claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the embodiments of the invention as expressed in the appended claims. Therefore, the technical scope of the present invention encompasses not only those embodiments described above, but all that fall within the scope of the appended claims.

What is claimed is:

1. A programmable controller facilitating debugging and testing comprising:

a main logic program containing instructions for controlling at least one device;

a diagnostic and service logic program that is a copy of the main logic program; and a switch connected with the main logic program and diagnostic and service logic program for selecting one of the main logic program and diagnostic and service logic program to send instructions to the at least one device wherein the main logic program and the diagnostic and logic program are operating at the same time.

2. The programmable controller according to claim 1, further comprising a communication path between the main logic program and diagnostic and service program for copying programming between the diagnostic and service program and main logic program.

3. The programmable controller according to claim 1, wherein the switch is one of a hardware switch and a software switch.

4. The programmable controller according to claim 1, further comprising a communications bus connected to said switch for communicating commands to the at least one device from the selected one of the main logic program and diagnostic and service logic program.

5. The programmable controller according to claim 1, wherein the switch comprises one of a switch on the controller and an interface switch connected between the diagnostic and service logic program, main logic program and the at least one device.

6. A method for servicing a programmable controller comprising:

making a diagnostic and service logic program having the same programming logic as a main logic program on the programmable controller active to communicate with at least one connected device;

operating the main logic program and diagnostic and service logic program at the same time;

debugging the programmable controller using the diagnostic and service logic program; and making the main logic program active again following debugging.

7. The method according to claim 6, further comprising copying changes made to the diagnostic and service logic program to the main logic program before making the main logic program active again.

8. The method according to claim 6, further comprising:

debugging the programmable controller by making changes to the programming logic of a logic program on the programmable controller;

restoring the programming logic after debugging.

9. The method of claim 8, wherein restoring comprises one of undoing the changes and reverting to a prior version of the logic program.

\* \* \* \* \*